US008406219B2

(12) United States Patent
Ahn (10) Patent No.: US 8,406,219 B2
(45) Date of Patent: Mar. 26, 2013

(54) NETWORKING DEVICE AND CONTENT TRANSMITTING METHOD USING THE SAME

(75) Inventor: Jong-hak Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1109 days.

(21) Appl. No.: 11/194,697

(22) Filed: Aug. 2, 2005

(65) Prior Publication Data

US 2006/0034170 A1 Feb. 16, 2006

(30) Foreign Application Priority Data

Aug. 11, 2004 (KR) ........................ 10-2004-0063200

(51) Int. Cl.
*H04L 12/28* (2006.01)
(52) U.S. Cl. ......... 370/351; 370/238; 370/254; 370/444
(58) Field of Classification Search .................. 370/254, 370/351, 444, 238
See application file for complete search history.

(56) References Cited

U.S. PATENT DOCUMENTS

| 6,212,682 | B1 * | 4/2001 | Kuno | 725/92 |
| 6,594,624 | B1 * | 7/2003 | Curet | 703/2 |
| 6,976,087 | B1 * | 12/2005 | Westfall et al. | 709/238 |
| 6,981,054 | B1 * | 12/2005 | Krishna | 709/235 |
| 7,272,658 | B1 * | 9/2007 | Edelman et al. | 709/231 |
| 7,307,956 | B2 * | 12/2007 | Kaplan et al. | 370/238 |
| 7,444,152 | B2 * | 10/2008 | Wu et al. | 455/445 |
| 7,480,735 | B2 * | 1/2009 | Shapiro et al. | 709/241 |
| 7,643,416 | B2 * | 1/2010 | Pardee et al. | 370/231 |
| 7,680,139 | B1 * | 3/2010 | Jones et al. | 370/414 |
| 2004/0042404 | A1 * | 3/2004 | Ravindran et al. | 370/238 |
| 2005/0025167 | A1 * | 2/2005 | Ishibashi et al. | 370/412 |
| 2006/0227706 | A1 * | 10/2006 | Burst, Jr. | 370/229 |
| 2008/0065772 | A1 * | 3/2008 | Tindal et al. | 709/226 |

FOREIGN PATENT DOCUMENTS

| JP | 6-232904 A | 8/1994 |
| JP | 6-327010 A | 11/1994 |
| JP | 11-261642 A | 9/1999 |
| JP | 2001-230832 A | 8/2001 |
| JP | 2001-251322 A | 9/2001 |
| JP | 2003-60691 A | 2/2003 |
| KR | 0150282 B1 | 12/1998 |
| KR | 10-2000-0016304 A | 3/2000 |
| KR | 2003-0033709 A | 5/2003 |
| KR | 2003-0034393 A | 5/2003 |

OTHER PUBLICATIONS

Massoulie, Laurent; Roberts, James☐☐Bandwidth Sharing: Objectives and Algorithms☐☐Jun. 2002, IEEE Transactions on Networking, vol. 10 No. 3, pp. 1 and 3.*

* cited by examiner

*Primary Examiner* — Mark Rinehart
*Assistant Examiner* — Christopher R Crompton
(74) *Attorney, Agent, or Firm* — Sughrue Mion, PLLC (57) ABSTRACT

A networking device and content transmitting method using the same are provided. The networking device includes a transmission path determining unit to determine a transmission path in order to transmit predetermined content to a device having requested the content, a priority determining unit to determine the priority of the content to be transmitted via the determined transmission path, and a content transmitting unit to transmit the concerned content via the determined transmission path according to the determined priority.

8 Claims, 8 Drawing Sheets

NETWORKING DEVICE AND CONTENT TRANSMITTING METHOD USING THE SAME

CROSS-REFERENCE TO RELATED APPLICATION

This application claims priority from Korean Patent Application No. 10-2004-0063200 filed on Aug. 11, 2004, the disclosure of which is incorporated herein in its entirety by reference.

BACKGROUND OF THE INVENTION

1. Field of the Invention

Apparatuses and methods consistent with the present invention relate to networking devices and transmission of content using them. More particularly, the present invention relates to a networking device and a data transmitting method using the same, capable of securing better quality of service when transmitting content over the network.

2. Description of the Related Art

As multimedia services are increasingly in need, criteria for securing better quality of service (QoS) when the multimedia content have been defined. Since any service not meeting the criteria cannot be properly supplied, research to establish accurate specifications and support them by a variety of protocol layers has been actively conducted.

For example, lower-level protocols such as a fiber distributed data interface (FDDI) and an asynchronous transfer mode (ATM) secure processing data within the maximum delay time, provide reservation functions of resources for the secured throughput, and define a variety of QoS parameters of a signal protocol.

Further, to prevent the quality of audio or video from deteriorating when transmitting multimedia data in a stream, QoS parameters including the maximum size of the transmitted data unit, and throughput are defined.

To use a limited bandwidth in an optimal manner, an application layer protocol divides multimedia data into several streams and each divided stream has a different QoS.

Figure 1:
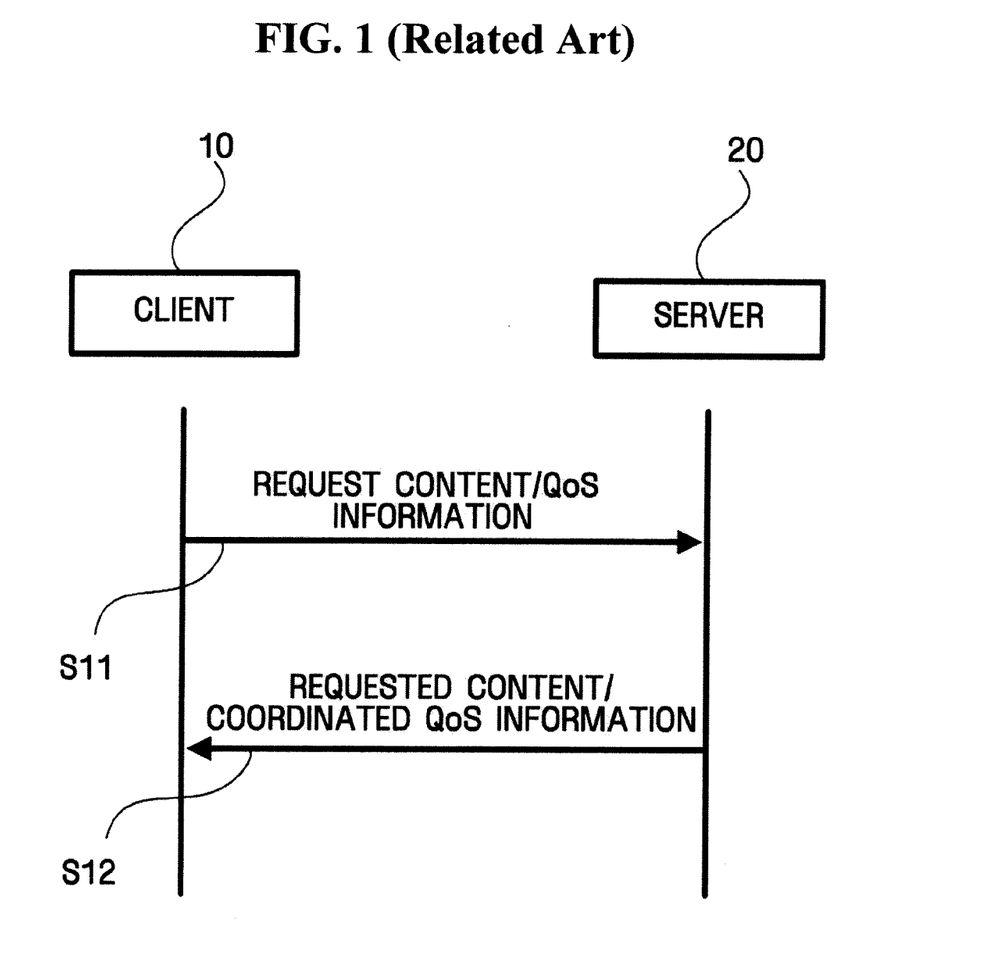
FIG. 1 illustrates coordination of QoS on the Internet according to a conventional art.

FIG. 1 illustrates a conventional coordination of QoS on the Internet.

As illustrated, a user transmits content to requesting information of a service supplied by a server 20 through a client 10 and information on QoS of the requested content (S11).

At this time, the user determines the QoS information based on various quality conditions relative to the content of the requested service.

QoS information is composed of content types, and quality criteria and classifications for those quality criteria.

For example, when the content type is image, the two quality criteria are color and size.

Examples of quality classifications include Full Color, Reduced Color, or Black and White for the color criterion, and Original, Small, or User Specified (size & scale) for the size criterion.

Table 1 shows quality criteria and classifications for the image, video and audio content types.

TABLE 1

Content Quality Criteria & Classifications

| Type | Quality Criteria | Quality Classifications |
|---|---|---|
| Image | Color | Full Color/Reduced Color/Black and White |
|  | Size | Original/Small/User Specified (size & scale) |
| Video | Frame rate | >25FPS/>12FPS/>5FPS |
|  | Resolution | 720 × 576/352 × 288/176 × 144 |
| Audio | Quality | Telephone/Hi-Fi Stereo/Others |

The server 20 determines whether it can supply the content, and it transmits the QoS information and the requested content to the client 10 if it can (S12).

The content transmitting method through QoS coordination (as described above) will be described with reference to FIG. 2, which illustrates a method for requesting content through QoS coordination according to the conventional art.

Figure 2:
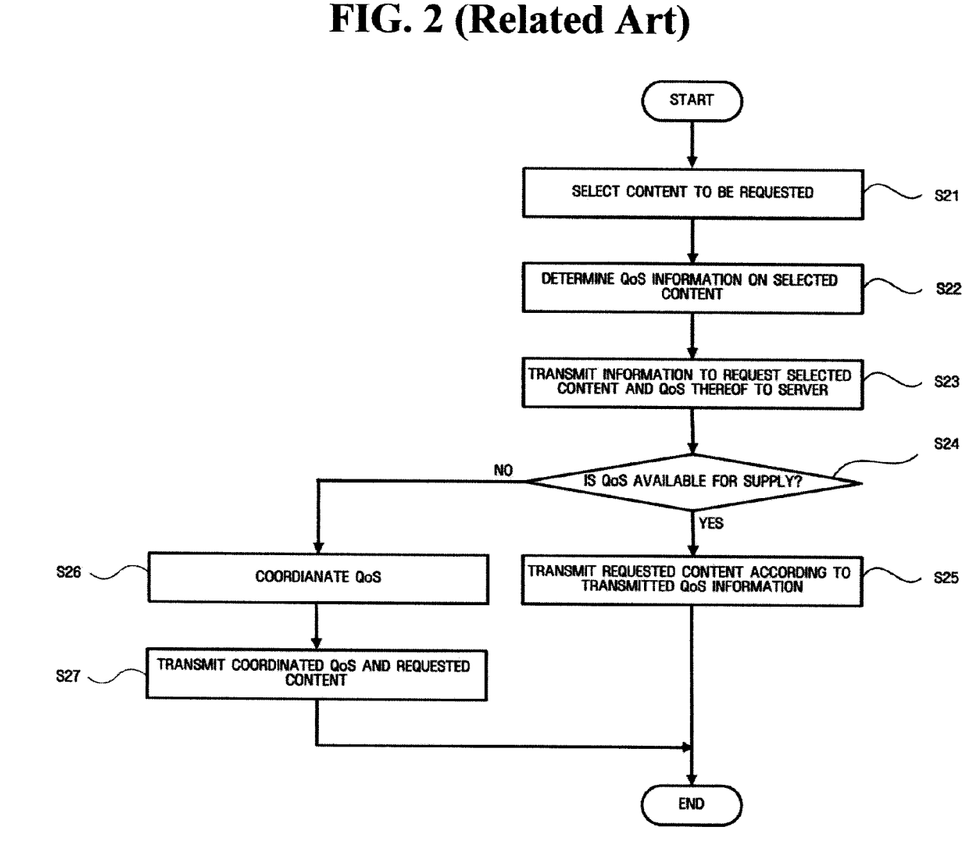
FIG. 2 illustrates requesting/transmitting content according to coordinated QoS according to the conventional art.

As illustrated, the user selects a content to be requested, of a service supplied from the server 20 through the client 10 (S21), and determines QoS information on the selected content (S22).

At this time, the user determines the QoS information as desired (see the quality conditions shown in Table 1).

The client 10 transmits content requesting information and QoS information to the server 20 (S23), and the server 20 determines whether it can supply the content with that QoS (S24).

When it is determined that it can transmit the content with the desired QoS, the server 20 transmits the content with the desired QoS (S25).

However, when it is determined that the QoS is out of its available range, the server 20 coordinates the transmitted QoS information with the QoS that it can supply (S26).

Then, the server 20 transmits the coordinated QoS information and the requested content to the client 10 (S27).

The server compares the bandwidth requirements of the QoS with the bandwidth of the network, and coordinates the QoS.

In other words, since the QoS degrades when the required bandwidth is larger than that of the network, the server determines whether the network bandwidth is suitable for the content to be transmitted according to the coordinated QoS, and re-coordinates the coordinated QoS according to the result of the determination.

Figure 3:
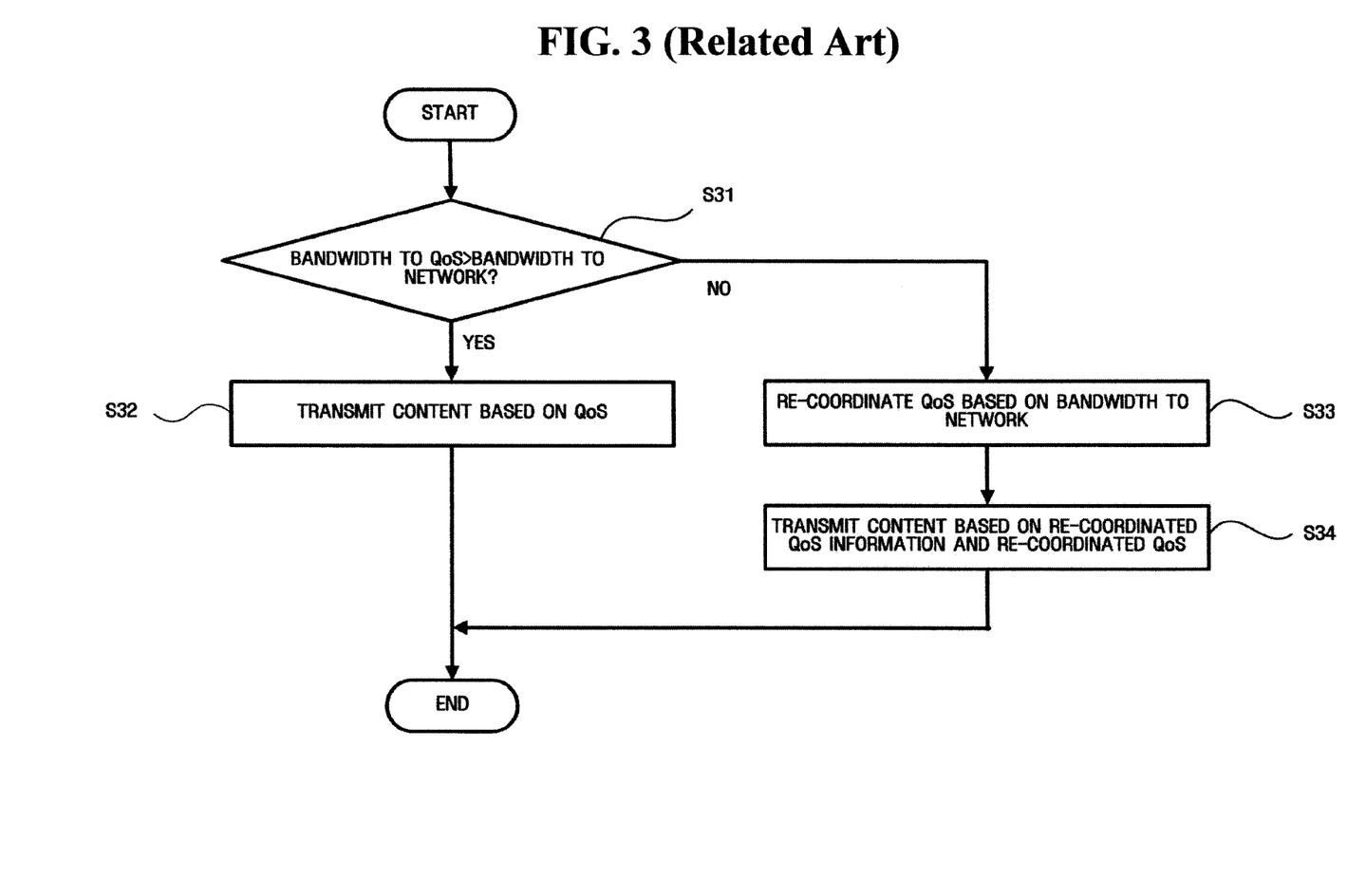
FIG. 3 illustrates a method to re-coordinate the coordinated QoS according to the conventional art, based on the bandwidth of the network.

As illustrated in FIG. 3, in the method of re-coordinating the QoS according to a state of the network, the bandwidth of the coordinated QoS is compared with that of the network (S31).

As a result of the comparison, when the bandwidth of the coordinated QoS is smaller than the network bandwidth, the server 20 transmits the content according to the coordinated QoS (S32).

When the bandwidth of the coordinated QoS is larger than the network bandwidth, the server 20 re-coordinates the coordinated QoS according to the network bandwidth (S33), and transmits the content based on the re-coordinated QoS (S34).

The above-described service transmitting method through the QoS coordination on the Internet according to the conventional art can not be properly applied to an environment under which a multiplicity of servers and clients, such as home network are in existence.

In other words, the Internet is a fixed network environment whereas a home network is not. In a home network, devices that instantaneously constitute a separate network exist and then disappear after having performed their function. As such, there it is difficult to coordinate the service bandwidth due to the uncertainty of the network.

Under the circumstances, a method is needed to secure a stable QoS in wired and wireless networks as well as on the Internet.

Korean Patent No. 0150282 discloses a method of preferentially designating the service quality of a multimedia service according to the state of the network to which an Internet client is connected, and controlling the service quality of multimedia data on the World Wide Web (WWW). However, a temporary slow-down is caused when multiple users share a resource. However, this method cannot be applied to those cases where multiple servers and clients exist and have dynamic network connections, as in a home network.

SUMMARY OF THE INVENTION

The present invention provides a networking device and a content transmitting method using the same, capable of securing a better QoS by giving priorities to contents to be transmitted where the contents are transmitted through a network.

According to an aspect of the present invention, there is provided a network device including a transmission path determining unit to determine a transmission path so as to transmit a predetermined content to a device having requested the content, a priority determining unit to determine priority of content to be transmitted through the determined transmission path, and a content transmitting unit to transmit the concerned content through the determined transmission path according to the determined priority.

According to another aspect of the present invention, a method of transmitting content using a networking device including determining a transmission path to transmit a content to a device having requested the concerned content, determining priority of the content to be transmitted through the determined transmission path, and transmitting the concerned content through the determined transmission path according to the determined priority.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the exemplary embodiments of the present invention will be described in detail with reference to the accompanying drawings.

Figure 4:
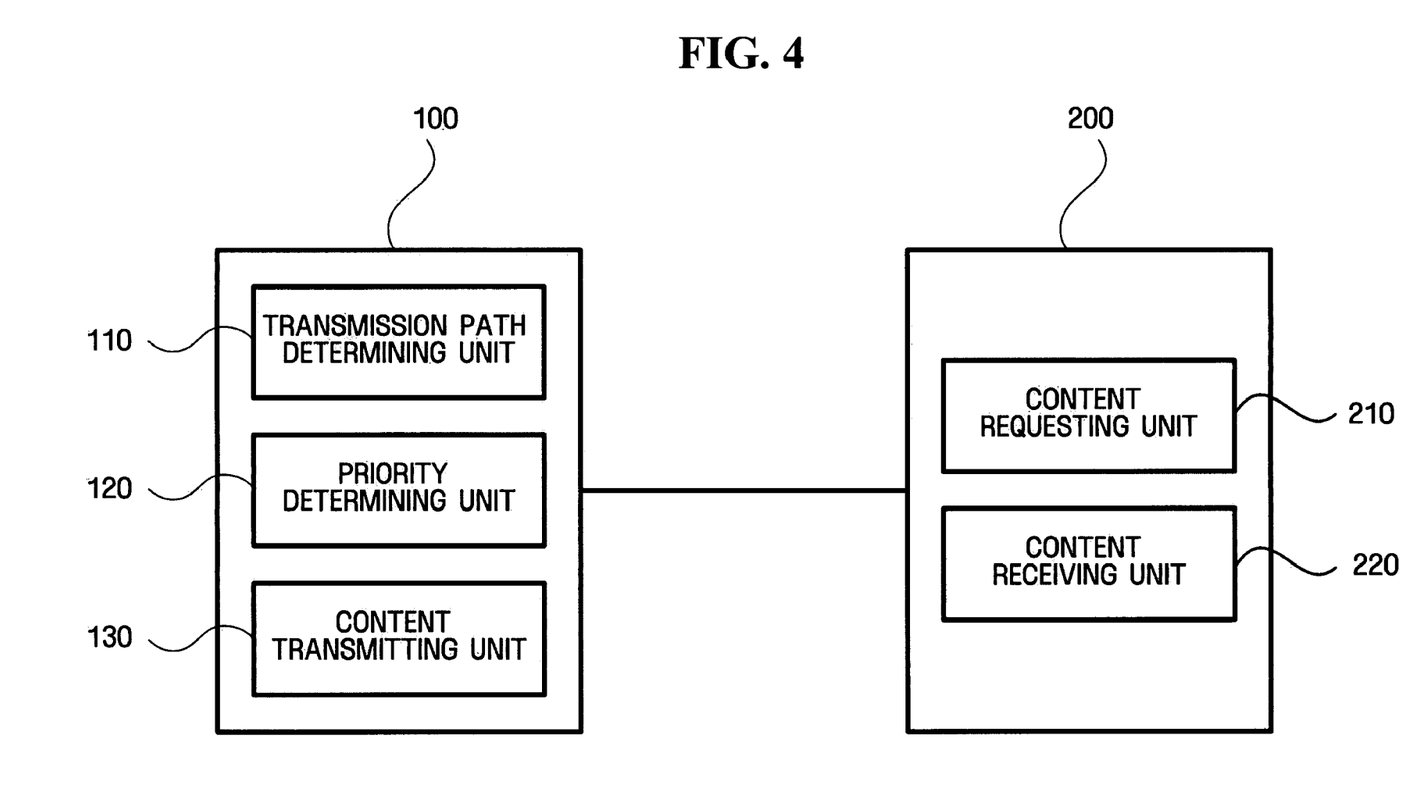
FIG. 4 illustrates a networking device according to an exemplary embodiment of the present invention.

FIG. 4 illustrates a networking device according to an exemplary embodiment of the present invention.

As illustrated, the networking device comprises a service supplying device 100 to supply content of services requested by a user, and a service requesting device 200 to request a desired service from the service supplying device 100.

The service supplying device 100 comprises a transmission path determining unit 110 to determine a transmission path to the service requesting device 200 in order to transmit the content requested by the user, a priority determining unit 120 to determine a priority of the content to be transmitted via the transmission path, and a content transmitting unit 130 to transmit the desired content to the service requesting device 200 according to the transmission path and the priority.

The service requesting device 200 may comprise a content requesting unit 210 to transmit request information to request content desired by the user, and a content receiving unit 220 to receive the requested content.

In an exemplary embodiment of the present invention, there may be one or more service supplying devices 100 and service requesting devices 220. Also, a case where the service supplying device 100 and the service requesting device 200 are connected in a home network is described by way of example, but the service supplying device 100 and the service requesting device 200 are not limited to home networks, but may be connected in a variety of networks including wired networks such as Universal Serial Bus (USB) and IEEE 1394, and wireless networks such as Bluetooth networks, and the Internet.

A device connected to the home network may function as a service supplying device 100 and a service requesting device 200.

Figure 5:
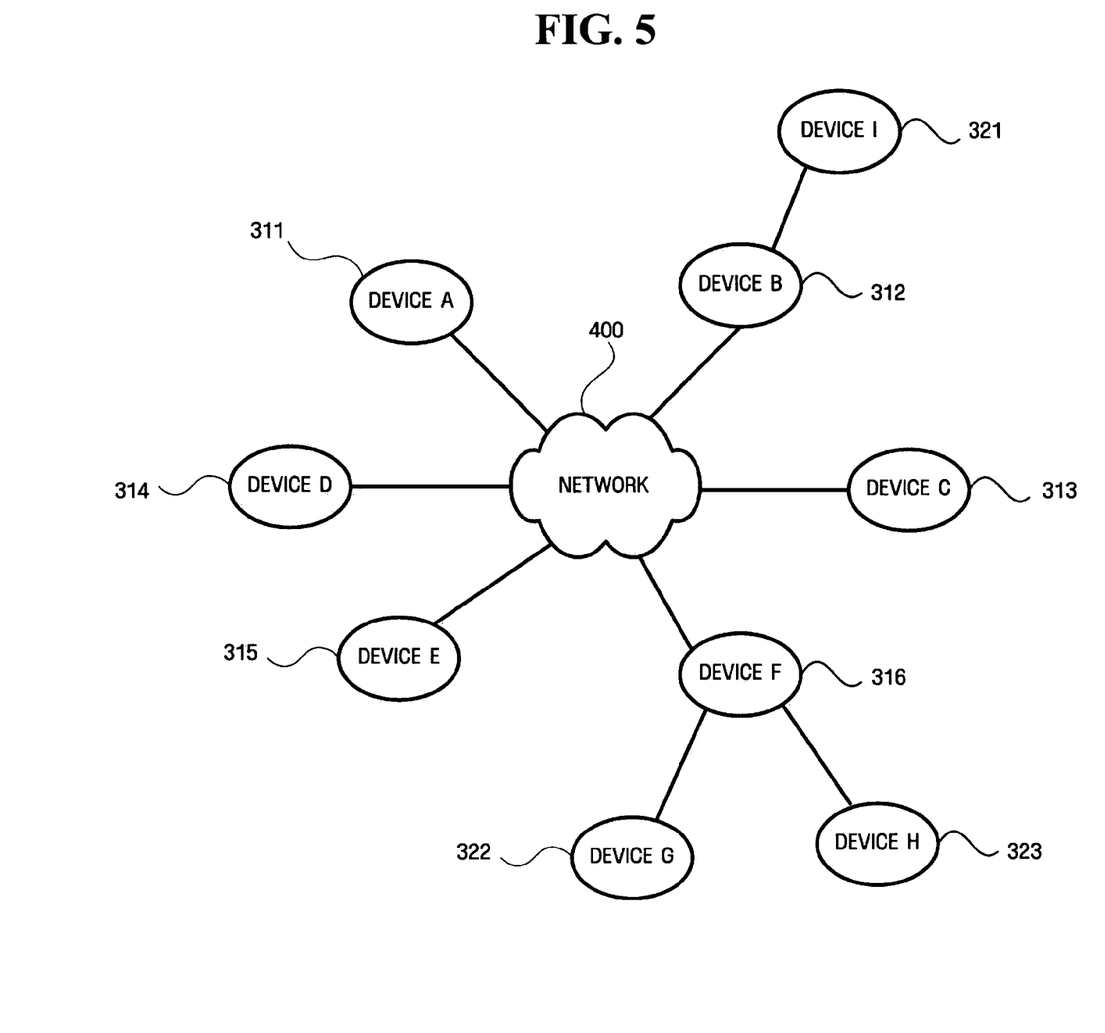
FIG. 5 illustrates a structure of home network according to an exemplary embodiment of the present invention.

In particular, a plurality of devices 311, 312, 313, 314, 315, 316, 321, 322 and 323 may be connected by a network or they may be connected to predetermined devices, i.e., Device B 312 and Device F 316, which are connected to the network, as illustrated in FIG. 5.

The devices 311, 312, 313, 314, 315, 316, 321, 322 and 323 may function as service supplying devices 100, or in some cases, as service requesting devices 200.

Hereinafter, an exemplary embodiment of the present invention will be described, under the assumption that Device A 311 is a service supplying device 100 and Device C 313 is a service requesting device 200.

The transmission path determining unit 110 may select a subnet consisting of both the service supplying device 100 and the service requesting device 200, when determining a transmission path to transmit content requested by the service requesting device 200.

At this time, the subnet is a set of devices having the same physical connections. In this exemplary embodiment, there may exist a plurality of subnets using various network technologies, such as local area network (LAN), IEEE 1394, USB and Bluetooth. Also, a device may exist in several different subnets.

In the home network, various types of networks may coexist.

For example, in the case of the home network described with reference to FIG. 5, there may exist various subnets as identified in Table 2.

TABLE 2

Subnet Network Types and Bandwidths

| | Device | Type | Bandwidth |
|---|---|---|---|
| Subnet 1 | Devices A, B, D, E and F | LAN | 100M |
| Subnet 2 | Devices B and I | IEEE 1394 | 200M |
| Subnet 3 | Devices F, G and H | USB | 50M |
| Subnet 4 | Devices A and C | Bluetooth | 300K |

At this time, the transmission path determining unit 110 may select subnet 4 including Device A 311 and Device C 313, which are a service supplying device 100 and a service requesting device 200, respectively.

The transmission path determining unit 110 compares the bandwidth of the selected subnet 4 with the bitrate of the content of the concerned service. As a result, the transmission path determining unit 110 may determine that selected subnet 4 has a transmission path where the bitrate is smaller than the bandwidth.

By the way, the transmission path determining unit 100 may determine the shortest transmission path where the bitrate of the content is larger than the bandwidth of the subnet, e.g., the bitrate of the content is 20 Mbps and the bandwidth of the selected subnet is 10 Mbps.

The shortest transmission path refers to the path having the smallest sum of costs, that is, the smallest sum of reciprocal numbers of bandwidths of the service supplying device 100 and the service requesting device 200. The cost may be computed using the following equation.

$$C = K/BW \quad (1)$$

where C refers to cost, K to a constant and BW to a bandwidth.

Figure 6:
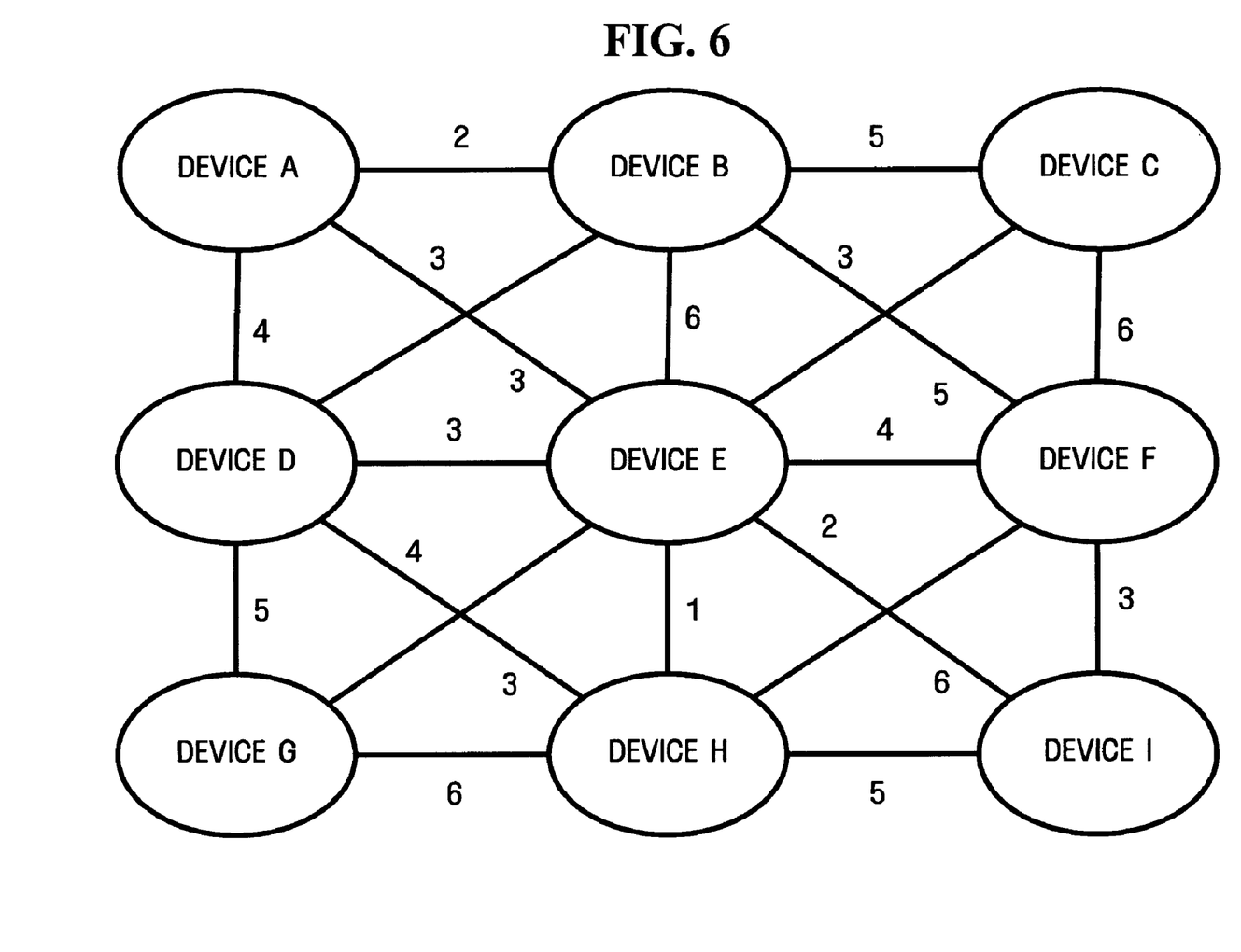
FIG. 6 illustrates the cost of each device at home network according to an exemplary embodiment of the present invention.

FIG. 6 illustrates the cost of each device 311, 312, 313, 314, 315, 316, 321, 322 and 323 in the home network of FIG. 5.

At this time, the transmission path determining unit 110 may determine Device A 311 -Device B 312-Device C 313 as the transmission path between Device A 311 and Device C 313 having the smallest cost (7).

At this time, the bandwidth of the devices 311, 312, 313, 314, 315, 316, 321, 322 and 323 may be ascertained with receiving current transmission states of all the devices within the home network, or a device supplying content may ascertain the bandwidth of the devices 311, 312, 313, 314, 315, 316, 321, 322 and 323 through broadcasts.

Since cost and bandwidth are inversely proportional, the bandwidth to be secured increases as the sum of the costs decreases, thereby enhancing QoS of the concerned content.

The priority determining unit 120 may determine the priority of the content requested by the user though the source property and type of content.

Table 3 represents examples of the priorities determined based on the source property and type of the content of the service requested by the user.

TABLE 3

Content Priorities

| QoS | Source | Type | Priority | QoS property |
|---|---|---|---|---|
| Highest quality | Real-time stream | Moving picture | 1 | No break, No delay |
| Highest quality | File stream | Moving picture | 2 | No break |
| Higher quality | Real-time stream | Moving picture | 3 | A little break |
| Higher quality | File stream | Moving picture | 4 | A little break |

TABLE 3-continued

Content Priorities

| QoS | Source | Type | Priority | QoS property |
|---|---|---|---|---|
| Higher/Highest quality | File stream | Image | 5 | Within 1 sec delay |
| Normal | All included | All included | 6 | Nothing secured |

In this exemplary embodiment, the priority determining unit 120 determines the priority of the preferential content according to the source property thereof, and then coordinates the priorities.

At this time, the condition to determine the priority of the content in the priority determining unit 210 is not limited to the source property and type of the content, but instead may be determined through various conductions such as frame rate, resolution, color and size of the concerned content.

The content transmitting unit 130 may transmit the concerned content after a predetermined standby time has passed and according to the priority determined by the priority determining unit 120.

In the case of a network supplying a QoS function, for example, a wireless LAN capable of giving priority to transmit content to a predetermined device, the content may be transmitted using the QoS function.

The content transmitting method using the networking device according to an exemplary embodiment of the present invention, with the configuration as described above, will be described below.

Figure 7:
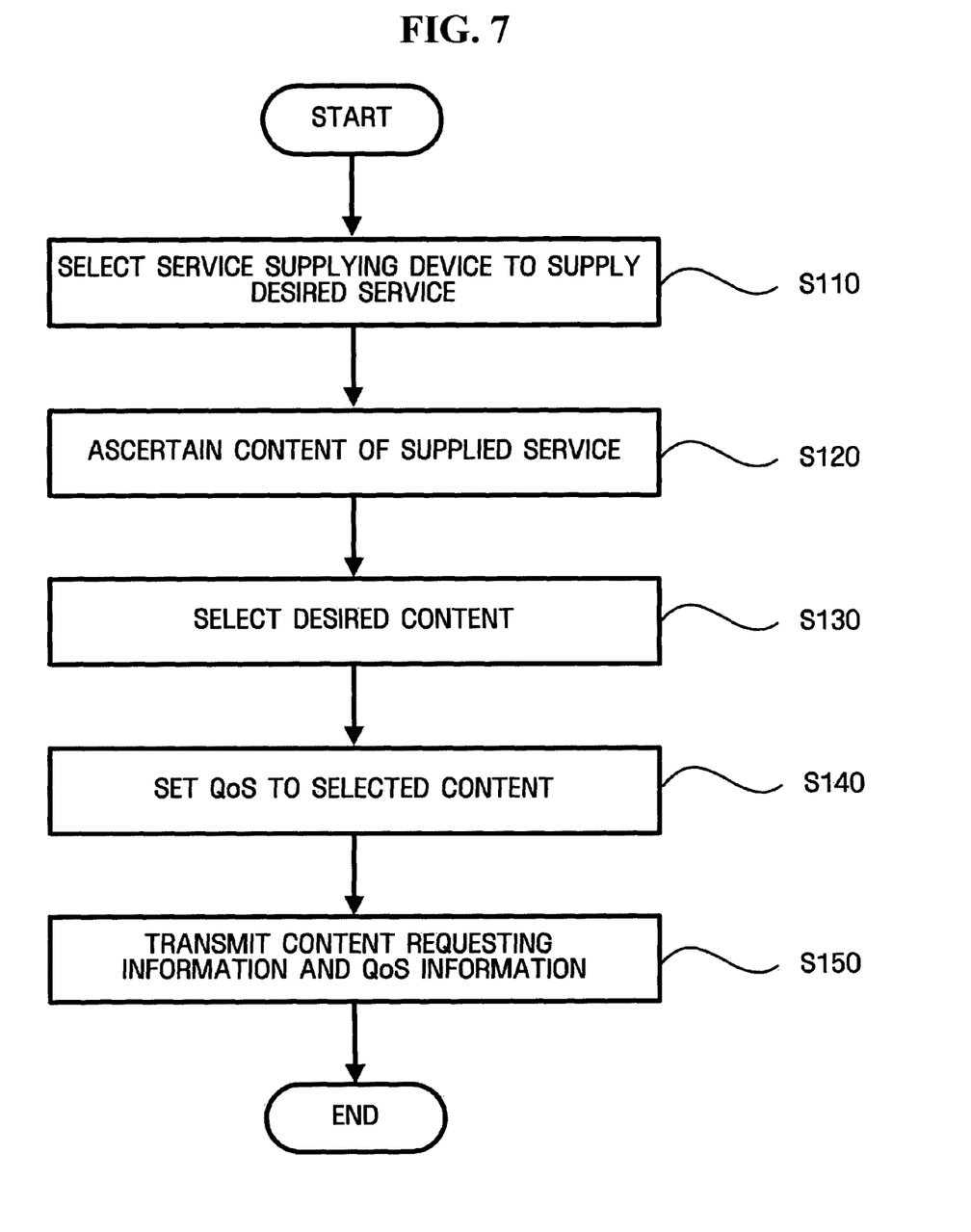
FIG. 7 illustrates a method of requesting content by means of a networking device according to an exemplary embodiment of the present invention.

FIG. 7 illustrates a method of requesting content of a predetermined service by means of a networking device according to an exemplary embodiment of the present invention.

As illustrated, the user first selects a service supplying device 100 to supply a desired service through a service requesting device 200 (S110).

The selected service supplying device 100 transmits a list of services available to be supplied to the service requesting device 200, and the user ascertains the content of the service supplied from the service supplying device 100 through the service requesting device 200 (S120).

The user selects content after having ascertained the service list (S130).

The content requesting unit 210 sets the QoS of the service selected by the user (S140), and transmits request information and QoS information about the selected content to the service supplying device 100 (S150).

In this exemplary embodiment, the QoS of the content selected by the user is set by the content requesting unit 210, but the invention is not limited thereto. The QoS of the selected content may be directly selected by the user by referring to Table 3.

Figure 8:
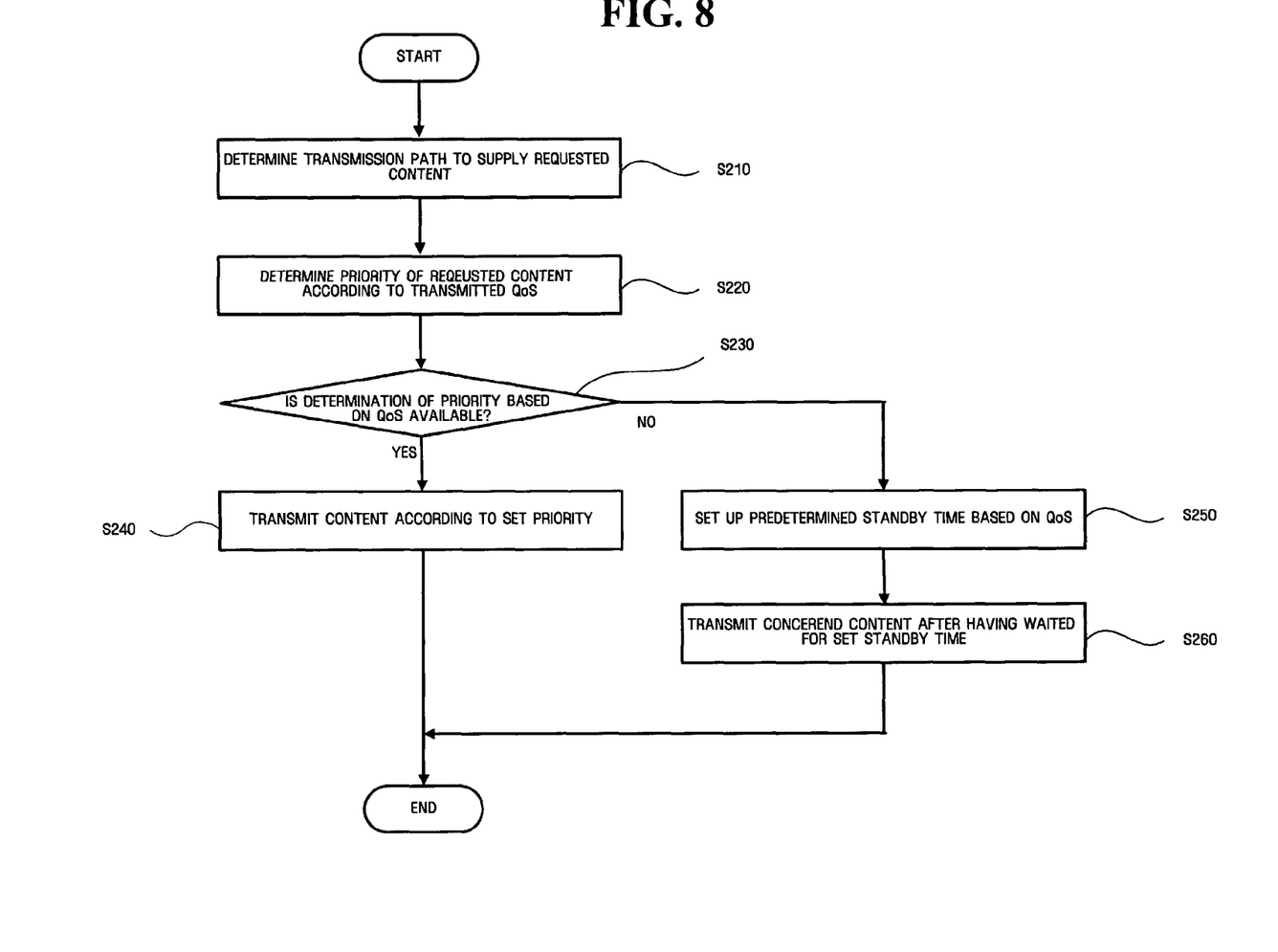
FIG. 8 illustrates a method of transmitting the content requested by means of another networking device according to an exemplary embodiment of the present invention.

FIG. 8 illustrates a method of supplying content according to the requested service by means of the networking device according to an exemplary embodiment of the present invention.

As illustrated, when the service requesting information is transmitted from the service requesting device 200, the transmission path determining unit 110 determines a transmission path to supply the requested content (S210).

When a subnet exists consisting of both the service supplying device 100 and the service requesting device 200, this subnet is first selected as a transmission path.

At this time, when the bandwidth of the selected subnet is smaller than the bitrate of the content to be transmitted, the shortest transmission path between the service supplying device 100 and the service requesting device 200 is calculated, and this path is chosen as the transmission path.

The shortest transmission path refers to a path having the smallest sum of costs. That is, to the smallest sum of reciprocal numbers of the bandwidths of the service supplying device 100 and the service requesting device 200.

At this time, since the larger bandwidth may be secured as the sum of costs decreases, the QoS of the content may be secured.

Once the transmission path is determined, the priority determining unit 120 determines the priority of the concerned content through the transmitted QoS information (S220).

The priority may be determined through the service requesting signal and the QoS information received at the same time from the service requesting device 200, or the priority may be determined using Table 3 (above).

At this time, the service supplying device 100 determines whether the network environment is able to supply a function for setting priorities according to the QoS (S230).

Using the priority setting function, the concerned content is transmitted by use of the QoS function of the concerned network, in a wireless LAN which is able to give priorities to predetermined devices.

As a result, when the priority setting function is supplied, the concerned content is transmitted based on the priority according to the supplied QoS (S240).

When the network including the service supplying device 100 and the service requesting device 200 does not support the QoS function, a predetermined standby time is set up according to the priorities determined in an application program (S250), and the concerned content is supplied to the service requesting device 200 after it has been on standby for the set standby time (S260).

For example, when the content supplied by the service supplying device 100 has any priority as identified in Table 3, the application program may set up a standby time of 0, 10, 20, 30 and 40 seconds for the concerned content corresponding to the priorities 1, 2, 3, 4 and 5, respectively.

In operation, the present invention may produce one or more of the following effects.

First, by giving priorities to content, the QoS of the content can be secured without respect to the network environment.

Second, since priorities can be given when content is transmitted between devices included in different networks, the QoS of the content can be secured in various network environments.

A networking device and a content transmitting method using the same according to the present invention have been described with reference to the accompanying drawings. However, it will be understood by those of ordinary skill in the art that various replacements, modifications and changes in form and details may be made therein without departing from the spirit and scope of the present invention as defined by the following claims.

What is claimed is:

1. A networking device comprising:
    a transmission path determining unit which determines a transmission path among a plurality of transmission paths, via which to transmit content to a device having requested the content;
    a priority determining unit which determines a priority of the content for transmission order among a plurality of content to be transmitted via the transmission path determined by the transmission path determining unit; and
    a content transmitting unit which transmits the content via the transmission path determined by the transmission path determining unit,
    wherein content is transmitted via the transmission path based on the priority determined by the priority determining unit,
    wherein the transmission path determining unit determines a path having a smallest sum of costs, which are reciprocals of bandwidths of the networking device and the device having requested the content.

2. The networking device of claim 1, wherein the transmission path determining unit determines a subnet including the networking device and the device having requested the content, as the transmission path.

3. The networking device of claim 1, wherein the priority determining unit determines the priority of the content according to quality criteria including at least one source property and type.

4. The networking device of claim 1, wherein the content transmitting unit transmits the content after a predetermined standby time which is set according to the priority.

5. A method of transmitting content using a networking device, the method comprising:
    determining a transmission path among a plurality of transmission paths, via which to transmit content to a device having requested the content;
    determining a priority of the content for transmission order among a plurality of content to be transmitted via the determined transmission path; and
    transmitting, by a service supplying device, the content via the determined transmission path based on the determined priority,
    wherein the determining the transmission path comprises determining a path having a smallest sum of costs, which are reciprocals of bandwidths of the networking device and the device having requested the content, as the transmission path.

6. The method of claim 5, wherein the determining the transmission path comprises determining a subnet including the networking device and the device having requested the content as the transmission path.

7. The method of claim 5, wherein determining the priority comprises determining the priority according to quality criteria including at least one source property and type of the content.

8. The method of claim 5, wherein transmitting the content comprises transmitting the content after a predetermined standby time which is set according to the priority.

* * * * *